Sept. 1, 1953     K. C. MOSIER ET AL     2,650,456
PRESSURE REGULATING VALVE
Filed Nov. 5, 1948     2 Sheets-Sheet 1
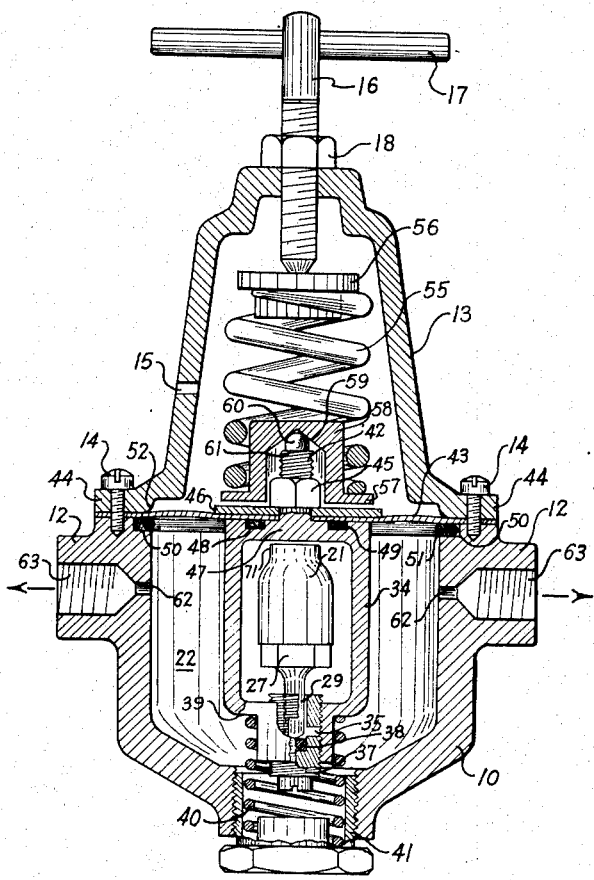
FIG.—1
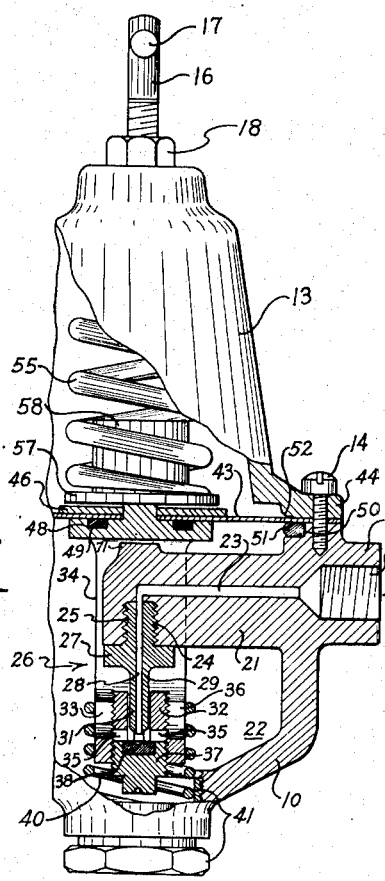
FIG.—2
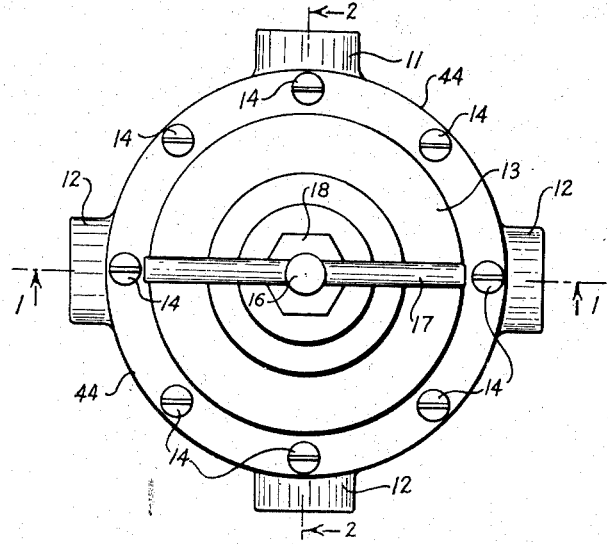
FIG.—3
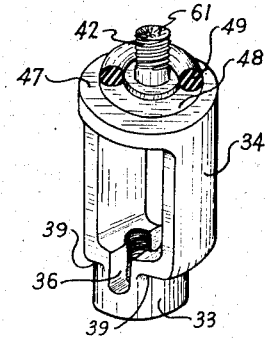
FIG.—4
*INVENTOR.*
Kenneth C. Mosier
& Glen K. Mead
By
*ATTORNEY*

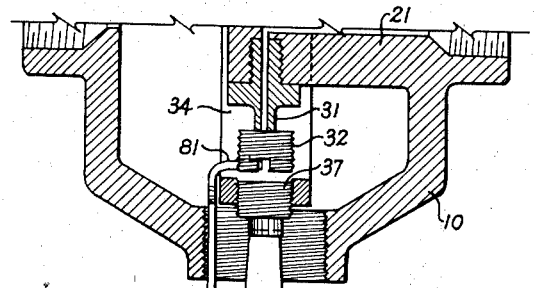
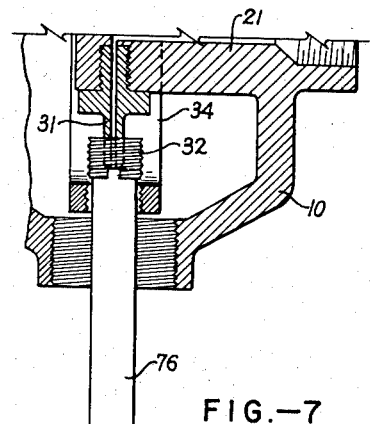
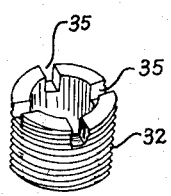
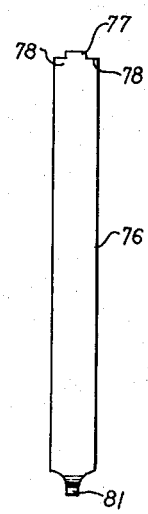
FIG.—6    FIG.—7    FIG.—5    FIG.—8    FIG.—9

Patented Sept. 1, 1953

2,650,456

UNITED STATES PATENT OFFICE 2,650,456

PRESSURE REGULATING VALVE

Kenneth C. Mosier and Glen K. Mead, Denver, Colo., assignors to C. A. Norgren Co., Denver, Colo., a corporation of Colorado Application November 5, 1948, Serial No. 58,462

3 Claims. (Cl. 50—23)

This invention relates, generally, to pressure reducing valves and it has particular relation to valves for reducing pressures of the order of one thousand to fifteen hundred pounds per square inch, as common to commercially bottled gases, to pressures at and below two hundred pounds per square inch, such a pressure reduction being desired for various purposes such as for the reduction of the bottle pressure of carbon dioxide to the working pressure for a soda fountain and other applications.

Among the objects of this invention are: To construct such a reducing valve in a manner that it is capable of maintaining accurately the desired working pressure and can be dismantled and reassembled in the field by a relatively unskilled workman without requiring that it be disconnected from the line; to support the valve seat against which the incoming high pressure reacts in a yoke that is movable vertically in the low pressure chamber of the valve body; to guide the yoke for such movement in the low pressure chamber; to secure the yoke at its upper end to a diaphragm that closes the upper end of the valve chamber; to seal the yoke to the diaphragm; to seal the diaphragm to the valve body in such manner that it can be dismantled and reassembled as aforesaid without soldering and yet afford a means for cushioning the diaphragm as it flexes; to employ a bonnet for sealing the diaphragm to the valve body by screws extending through the bonnet into the valve body rather than to thread the former into the latter; to position the valve operating mechanism so that the diaphragm is always in the free position; and to apply adjusting spring pressure to the yoke without likelihood of cocking it in the valve body. Other objects of this invention will, in part, be obvious and in part appear hereinafter.

In the drawing:

Fig. 1 is a vertical sectional view of a pressure reducing valve in which this invention is embodied, the section being taken along the line 1—1 of Fig. 3;

Fig. 2 is a view partly in side elevation and partly in section taken along the line 2—2 of Fig. 3;

Fig. 3 is a top plan view of the valve shown in Figs. 1 and 2; and

Fig. 4 is a perspective view of the yoke shown in Figs. 1 and 2 which supports the valve seat and is movable along a vertical axis of the valve body;

Fig. 5 is a perspective view of a valve guide in inverted position;

Figs. 6 and 7 are partial vertical sections through the valve body showing the process of adjustment; and Figs. 8 and 9 are side views of an adjusting tool for use with our valve.

Referring to the figures of the drawing, it will be noted that the reference character 10 designates a generally cylindrical valve body in the form of a metallic forging which has an integral high pressure inlet boss 11 and three low pressure outlet bosses 12. It will be understood that only one outlet boss 12 may be provided or used, the others being closed by suitable screw plugs as desired. The space above the valve body 10 is enclosed by a bonnet 13 which may be secured in position by screws 14, rather than itself being threaded into the valve body 10, to provide for sealing the upper open end of the valve body 10 in a manner to be described presently. The bonnet 13 has a relief opening 15 through which the fluid whose pressure is being reduced can escape to the atmosphere in the event that the diaphragm, referred to in more detail hereinafter, should be ruptured. An adjusting screw 16 is threaded through the upper end of the bonnet 13 and has a handle 17 at its outer end. A lock nut 18 serves to hold the screw 16 in any position in which it may be set.

As shown in Fig. 2, the inlet boss 11 is internally threaded at 20 to permit connection to a source of high pressure fluid and there is a boss 21 that extends radially inwardly from a wall of the valve body 10 into a low pressure chamber 22 within the same. The boss 21 has a longitudinal aperture 23 that communicates with the threaded end 20 of the inlet boss 11 and a laterally extending tapped hole 24 thereby providing an L-shaped passageway with the shorter leg extending downwardly along the vertical axis of the cylindrical valve body 10. It will be noted that the upper end 25 of a valve stem, shown generally at 26, is threaded into the tapped hole 24 and that the stem has a hexagonal intermediate portion 27 to which a wrench can be applied. An aperture 28 extends through the stem 26 and constitutes an extension of the short leg of the L-shaped passageway referred to above. The aperture 28 extends through a lower stem portion 29 of reduced diameter which serves as a guide for the valve mechanism now to be described.

In Figs. 2 and 3 it will be observed that the lower stem portion 29 projects through an opening 31 in a valve guide 32 which is threaded into the lower end 33 of a yoke 34 which extends around the boss 21 and is movable along the vertical axis of the valve body 10. The opening 31 is of sufficient size to provide a clearance for the lower stem portion 29 while serving to guide the yoke 34 in its vertical movement as described. At its lower end the valve guide 32 has four radially milled slots 35, two of which register with slots 36, Fig. 4, in the upper side of the lower end 33 of the yoke 34. It will be understood that the aperture 28 communicates with the low pressure chamber 22 through the slots 35 in the lower end of the valve guide 32 and the slots 36 in the yoke 34.

A valve seat support 37 is threaded into the underside of the lower end 33 of the yoke 34 into engagement with the lower end of the valve guide 32 for locking it in position. The support 37 carries a valve seat 38 of synthetic rubber or like resilient material for engaging the lower end of the stem portion 29 to close off the aperture 28.

For certain purposes, as for example when the valve is employed for controlling the flow of carbon dioxide, oxygen, or the like, the seat 38 may be formed of somewhat harder and more inert materials such as polymerized polyamide (nylon) resin and similar materials.

It is pointed out that the incoming high pressure fluid vents from the aperture 28 into the chamber 22 whenever valve seat 38 moves away from the lower end of the stem portion 29. The lower end 33 of yoke 34 forms a shoulder 39 for receiving the upper end of a coil compression valve closing spring 40 whose lower end, as shown in Fig. 1, is supported by a bottom plug 41 that is threaded into the underside of the valve body 10. The spring 40 opposes the high pressure acting on the valve seat 38 and biases it toward the closed position.

As illustrated in Figs. 1 and 4, the yoke 34 has a threaded extension 42 which projects through a central aperture in a diaphragm 43 that closes the upper open end of the chamber 22 in the valve body 10 and is located between a radially outwardly extending flange 44 of the bonnet 13, through which the screws 14 extend, and the upper face of the valve body 10. A clamp nut 45 is threaded on the extension 42 and bears against a flat washer 46 to clamp the diaphragm 43 to the yoke 34. The upper end 47 of the yoke 34 has an annular groove 48 in its upper surface for receiving an O ring 49 of resilient synthetic rubber or the like to provide a sealed connection between the diaphragm 43 and the yoke 34. When the nut 45 is tightened against the washer 46, the ring 49 is flattened in the groove 48 and compressed to provide the required seal.

The seal between the diaphragm 43 and the valve body 10 is provided in a similar manner. It will be noted that an annular groove 50 extends around the upper end of the chamber 22 in the valve body 10 and that an O ring 51 is located therein. The ring 51, like the ring 48, is formed of rubber-like material, such as synthetic rubber, and it is flattened or compressed as shown to provide the required seal between the diaphragm 43 and the valve body 10 when the bonnet 13 is fastened thereto by the screws 14. Obviously this construction facilitates dismantling of the reducing valve assembly and reassembly in the field by an ordinary workman. It is unnecessary to solder the diaphragm 43 in place and to melt the solder for removing it. The screws 14, which can be tightened by a screw driver, maintain the sealed connection. Tests have shown that only two of them oppositely located are sufficient to maintain the seal, although eight are shown to provide a desired factor of safety. The inner edge 52 of the flange 44 is convex and merges with its flat under surface along the center of the cross section of the rings 51 to insure that the seal is provided as described and to avoid a sharp corner over which the diaphragm 43 otherwise would be required to flex. The point about which the diaphragm 43 must flex is therefore cushioned by the ring 51, which also provides a curved surface bearing against the diaphragm, and greatly prolongs diaphragm life by elimination of potential stress concentration points, and improves performance by permitting greater flexibility.

Within the bonnet 13 there is provided a coil compression valve adjusting spring 55 whose upper end bears against the underside of a spring seat 56 which, as shown, is engaged by a pointed lower end of the adjusting screw 16, bearing against a cone-shaped cavity in the head of the spring seat 56. The lower end of the spring 55 bears against a radial flange 57 of a hat-shaped spring seat 58, which encloses the threaded extension 42 and has a conical seat 59 on its under side for engaging a ball 60 or other suitable bearing permitting rotation of the spring seat 58, which rests in a conical or spherical depression formed on the upper end 61 of the extension 42. The under side of the flange 57 is spaced slightly from the upper surface of the washer 46 and thus the sole mechanical connection between the hat-shaped spring seat 58 and the extension 42 is through the ball 60. Using this construction there is no likelihood of cocking of the yoke 34 and parts assembled therewith resulting from pressure applied thereto by the spring 55, or of developing appreciable torque upon such parts, since the seat 58 may turn freely or tilt slightly in any direction. Essentially, the force of the spring 55 is transmitted to the yoke 34 through a point, which cannot transmit torsion.

Furthermore, improper valve seating due to cocking of the yoke does not occur, since the seat 38 is concave to mate with the rounded end of the stem 31, and because the guide 32 is disposed close to the seat 38.

Suitable apertures 62 extend through the walls of the valve body 10 into threaded openings 63 in the outlet bosses 12 to which the low pressure connection or connections can be made as will be understood readily.

In operation, the screw 16 is adjusted to compress the valve adjusting spring 55 to the extent required to maintain the desired opening between the lower end of the valve stem 29 and the upper surface of the valve seat 38 when connected to a source of high pressure fluid through inlet 20 and with gas flowing through the valve. The force exterted by the spring 55 is in the same direction as that exterted by the incoming high pressure fluid on the valve seat 38. These forces are opposed by the force of the valve closing spring 40 and the pressure exerted on the under side of the diaphragm 43 by the fluid at reduced pressure in the chamber 22. When no fluid flows out of the chamber 22, sufficient pressure builds up within it to hold the valve seat 38 in the closed position. As fluid is withdrawn from the chamber 22, the pressure therein is reduced and the spring 55 forces the diaphragm 43 to flex downwardly, allowing the yoke 34 to move in the same direction and carrying with it the valve seat 38. The construction is such that a very accurate control of the outlet pressure can be maintained within narrow limits due in part to the design which permits the diaphragm 43 to remain substantially in the free position regardless of whether the valve is open or closed.

To attain accurate, dependable operation, and to enable presetting of our valve to a prescribed secondary pressure, it is necessary to accurately position the valve seat 37 in the yoke 34 with respect to the end of the stem 31, and to increase durability, maximum movement of the diaphragm should be limited. We therefore form a pad 71 on the upper surface of the base 21, the upper surface of the pad being a known and closely controlled distance below the level of the upper face of the body 10.

Since the yoke 34 is also accurately formed and is mounted around the base 21, it may be seen that the downward travel of the yoke 34 and therefore also of the diaphragm 43 is limited, preventing flexure beyond its limits.

In assembly, the screw 16 is tightened until the yoke 34 is forced firmly against the pad 71, the plug 41 being removed. The guide 32 is then screwed into the threaded opening in the yoke 34 with a tool 76, provided at one end with a tongue 77 projecting beyond laterally extending shoulders 78. The tool 76 is formed from a strip of suitable width and thickness for engagement with the slots 35 formed in the guide 32, and the distance between the face of the tongue 77 and the shoulders 78 is closely controlled. Thus as the guide 32 is turned by the tool 76, the tongue 77 engages the discharge end of the stem 31, and the shoulders 78 will be forced from the slots 35 when the lower face of the guide 32 reaches a level below the stem equal to the distance from the face of the tongue 77 to the shoulders 78. The tool 76 is then inverted, as shown in Fig. 6, and a laterally extending hook or tongue 81 is inserted in one of the slots 35 through the yoke 34 to hold the guide in position. The seat 37 may then be inserted and tightened with a screw driver 82 against the lower face of the guide 32, thus both locking the guide and seat in position and accurately fixing the position of the seat 37 with respect to the stem 31.

The durability and efficiency of our valve will be increased under most circumstances by reducing the diameter of the opening 28 in the valve stem 25 from the customary one sixteenth inch diameter bore to about one thirty-second of an inch (0.025" to 0.045"), particularly when the valve is employed to govern the release of high pressure carbon dioxide gas. Two effects are obtained by reduction in diameter of this opening. First, carbon dioxide gas when released creates a marked reduction in temperature, which tends to harden the valve seat and create a certain amount of distortion which changes the adjustment of the valve. By the use of a smaller opening, the valve opens a somewhat greater distance, thereby reducing the cooling effect of the released gas on the valve seat. Secondly, the drop in pressure experienced as the tank approaches exhaustion is substantially reduced. For example, using a one sixteenth inch diameter opening a secondary pressure on the valve may be set to seventy pounds when the tank pressure is say twelve hundred pounds per square inch. If the tank pressure drops to two hundred pounds per square inch, the secondary pressure through the valve will approximate forty pounds. If, however, the diameter of the opening is reduced to one thirty-second inch and the valve initially set to seventy pounds, secondary pressure, the secondary pressure will drop to only approximately 64 pounds when the tank falls to approximately two hundred pounds.

Since certain changes can be made in the foregoing construction without departing from the spirit and scope of the invention, all matter described above or shown in the accompanying drawings is intended to be interpreted as illustrative, and not in a limiting sense.

We claim:

1. In a pressure reducing valve, a hollow body having an inlet and an outlet defining a fluid passageway having an open top, an apertured valve stem mounted within said body and constituting a portion of said passageway, a bonnet on the hollow body, a diaphragm closing said open top and sealed between the bonnet and the hollow body, a valve seat, a member supporting the valve seat and secured to the diaphragm for moving the valve seat with the diaphragm to open and close the valve stem, said member including a stud projecting through said diaphragm, a hat-shaped spring seat over the stud having a laterally extending flange spaced from the diaphragm, said spring seat having a conical bottom in the recess thereof, a ball bearing on the stud supporting said spring seat, said stud having a recess on the end thereof for supporting said ball on the circular bearing line, said ball supporting said spring seat on a circular bearing line in said conical bottom whereby said spring seat freely rotates and oscillates under applied spring pressure, said spring bearing against the flange on the hat-shaped spring seat, and means threaded to the bonnet for forcing the spring against the flange.

2. In a pressure reducing valve, in combination, a generally cylindrical valve body open at the top and having an annular groove in its upper face and providing a low pressure chamber having one or more low pressure outlets, a boss extending from a wall of said valve body radially inwardly into said chamber and having an inlet for connection to a high pressure fluid source and an L-shaped passageway therethrough with the short leg opening downwardly through an apertured valve stem into said chamber, a yoke extending around said boss and movable relative thereto along the central vertical axis of said valve body and guided on said valve stem, a valve seat carried by the lower end of said yoke for engaging the lower end of said valve stem to close off the aperture therethrough, a coil compression valve closing spring reacting between said valve body and said yoke and biasing said valve seat toward said lower end of said valve stem against the force exerted thereon by the incoming high pressure fluid, a diaphragm having a central aperture closing the open top of said valve body to be acted upon by the pressure in said chamber for cooperating with said valve closing spring to move said valve seat into engagement with the lower end of said valve stem, a bonnet enclosing the space above said diaphragm, means clamping said bonnet to said upper surface of said valve body with said diaphragm therebetween, a threaded extension projecting upwardly from said yoke through said aperture in said diaphragm, a nut on said extension acting to clamp said diaphragm to said yoke to effect conjoint movement thereof, a hat-shaped spring seat enclosing said threaded extension of said yoke with its lower outwardly flanged end spaced from said diaphragm, a ball interposed between the upper end of said threaded extension and the central under side of said hat-shaped spring seat and providing the sole mechanical interconnection therebetween, a coil compression valve adjusting spring surrounding the central portion of said hat-shaped spring seat with the lower end bearing against its flanged lower end and extending upwardly in said bonnet and acting against said valve closing spring and the pressure applied in said chamber to said diaphragm and with the high pressure applied to said valve seat to move it away from the lower end of said valve stem, a spring seat at the upper end of said valve adjusting spring, and an adjusting screw threaded in said bonnet and bearing against said spring seat at the upper end of said valve adjusting spring for adjusting its tension.

3. In a pressure reducing valve, in combination, a generally cylindrical valve body open at the top and having an annular groove in its upper face and providing a low pressure chamber having one or more low pressure outlets, a boss extending from a wall of said valve body radially inwardly into said chamber and having an inlet for connection to a high pressure fluid source and an L-shaped passageway therethrough with the short leg opening downwardly, a valve stem threaded into said boss having a central aperture constituting an extension of said short leg of said L-shaped passageway and a lower stem portion through which said aperture extends, a yoke having an annular groove in its upper surface and extending around said boss and movable relative thereto along the central vertical axis of said valve body and having oppositely extending slots near its lower end opening into said chamber, a valve guide threaded into said yoke and guided on said valve stem and having oppositely positioned radial slots registering with said slots in said yoke for placing said aperture in said valve stem in communication with said chamber, a valve seat support threaded into the lower end of said yoke, a valve seat carried by the upper end of said valve seat support for engaging the lower end of said valve stem to close off said aperture, a coil compression valve closing spring reacting between said valve body and said valve seat support and biasing said valve seat toward said lower end of said valve stem against the force exerted thereon by the incoming high pressure fluid, a diaphragm having a central aperture closing the open top of said valve body to be acted upon by the pressure in said chamber for cooperating with said valve closing spring to move said valve seat into engagement with the lower end of said valve stem, a ring of rubber like material in said annular groove and engaging the under side of said diaphragm, a bonnet enclosing the space above said diaphragm and having a radial flange, threaded means clamping said radial flange to said upper surface of said valve body with said diaphragm therebetween, the inner periphery of said radial flange being convex along the center of the cross section of said ring to compress the same and provide a fluid tight seal between said valve body and said diaphragm, a threaded extension projecting upwardly from said yoke through said aperture in said diaphragm, a ring of rubber like material in said annular groove in the upper end of said yoke and engaging the under side of said diaphragm, a washer surrounding said threaded extension of said yoke, a nut on said extension acting to hold said washer in clamping engagement with the upper surface of said diaphragm and the latter against said ring in said yoke groove to provide a fluid tight seal between said yoke and said diaphragm and to effect conjoint movement thereof, a hat-shaped spring seat enclosing said threaded extension of said yoke with its lower outwardly flanged end spaced from said washer, a ball interposed between the upper end of said threaded extension and the central under side of said hat-shaped spring seat and providing the sole mechanical interconnection therebetween, a coil compression valve adjusting spring surrounding the central portion of said hat-shaped spring seat with the lower end bearing against its flanged lower end and extending upwardly in said bonnet and acting against said valve closing spring and the pressure applied in said chamber to said diaphragm and with the high pressure applied to said valve to move it away from the lower end of said valve stem, a spring seat at the upper end of said valve adjusting spring, and an adjusting screw threaded in said bonnet and bearing against said spring seat at the upper end of said valve adjusting spring for adjusting its tension.

KENNETH C. MOSIER.
GLEN K. MEAD.

References Cited in the file of this patent

UNITED STATES PATENTS

| Number | Name | Date |
|---|---|---|
| 1,491,411 | Morrison | Apr. 22, 1924 |
| 1,632,055 | Campbell | June 14, 1927 |
| 1,648,304 | Harris | Nov. 8, 1927 |
| 1,770,192 | Bennett | July 8, 1930 |
| 1,880,615 | White | Oct. 4, 1932 |
| 2,070,068 | Rice | Feb. 9, 1937 |
| 2,105,876 | Birch | Jan. 18, 1938 |
| 2,360,178 | Turpin | Oct. 10, 1944 |
| 2,400,083 | Fillinger | May 14, 1946 |